(12) United States Patent
Stitcher

(10) Patent No.: US 10,986,958 B2
(45) Date of Patent: Apr. 27, 2021

(54) FORMABLE FLUID WARMING APPARATUS

(71) Applicant: Michael J. Stitcher, Olivette, MO (US)

(72) Inventor: Michael J. Stitcher, Olivette, MO (US)

(73) Assignee: Michael J. Stitcher, Olivette, MO (US)

( * ) Notice: Subject to any disclaimer, the term of this patent is extended or adjusted under 35 U.S.C. 154(b) by 104 days.

(21) Appl. No.: 16/283,984

(22) Filed: Feb. 25, 2019

(65) Prior Publication Data

US 2020/0268199 A1    Aug. 27, 2020

Related U.S. Application Data

(60) Provisional application No. 62/809,124, filed on Feb. 22, 2019.

(51) Int. Cl.
*A47J 36/28* (2006.01)
*B65D 81/34* (2006.01)
*A47J 36/24* (2006.01)

(52) U.S. Cl.
CPC .......... *A47J 36/28* (2013.01); *A47J 36/2411* (2013.01); *B65D 81/3484* (2013.01)

(58) Field of Classification Search
CPC ......... A41D 19/00; B65D 81/34; A47J 36/28; A47J 36/2411
See application file for complete search history.

(56) References Cited

U.S. PATENT DOCUMENTS

| | | | | |
|---|---|---|---|---|
| 4,067,313 A * | 1/1978 | Donnelly | ................ | F24V 30/00 126/263.1 |
| 4,886,063 A * | 12/1989 | Crews | ....................... | A61F 7/02 607/112 |
| 5,056,589 A * | 10/1991 | Hettel | ................... | F28D 20/028 126/263.04 |
| 5,187,814 A * | 2/1993 | Gold | ...................... | A41B 11/00 2/160 |
| 5,212,739 A * | 5/1993 | Johnson | ................... | G06K 9/48 382/177 |
| 6,029,277 A * | 2/2000 | Picchione, II | ... | A41D 19/01582 2/16 |
| 6,141,801 A * | 11/2000 | Helenick | .......... | A41D 19/01535 2/159 |
| 6,185,744 B1 * | 2/2001 | Poholski | ............ | A41D 13/0058 2/102 |
| 6,895,763 B1 | 5/2005 | Seymour | | |
| 7,043,768 B2 * | 5/2006 | Gogarty | ........... | A41D 19/01535 2/161.1 |
| 7,125,417 B2 * | 10/2006 | Mizrahi | ................. | A61K 36/28 607/114 |
| 7,254,842 B2 * | 8/2007 | Becerra | ............. | A41D 19/0068 2/161.7 |
| 7,934,537 B2 | 5/2011 | Kolowich | | |
| 8,256,411 B2 * | 9/2012 | Christy | ................... | A47J 36/30 126/263.01 |

(Continued)

FOREIGN PATENT DOCUMENTS

CA        87210378 U  *  8/1988  ............ Y02E 10/40

*Primary Examiner* — David J Laux
*Assistant Examiner* — Nikhil P Mashruwala
(74) *Attorney, Agent, or Firm* — Taft Stettinius & Hollister LLP; Derek B. Lavender

(57) ABSTRACT

A warming apparatus that has a formable apparatus and a chamber coupled to the formable apparatus and configured to fluidly contain a heating agent. Wherein the formable apparatus is movable to reposition the chamber to heat a vessel.

13 Claims, 7 Drawing Sheets

(56) References Cited

U.S. PATENT DOCUMENTS

| | | |
|---|---|---|
| 8,319,154 B2 | 11/2012 | Shaikh et al. |
| 8,796,591 B2 | 8/2014 | Schwartz |
| 9,687,034 B2 * | 6/2017 | Clemente ......... A41D 19/01535 |
| 9,913,500 B1 * | 3/2018 | Matthews ............... A41D 1/005 |
| 2002/0198580 A1 * | 12/2002 | Clayton .................... A61F 7/02 607/109 |
| 2008/0178865 A1 | 7/2008 | Retterer |
| 2008/0179311 A1 | 7/2008 | Koro et al. |
| 2008/0208298 A1 * | 8/2008 | Mizrahi .................... A61F 7/02 607/108 |
| 2013/0174600 A1 * | 7/2013 | Sarcinella .......... B65D 81/3272 62/457.9 |
| 2013/0219941 A1 * | 8/2013 | French ............... B60H 1/00264 62/243 |
| 2015/0157065 A1 * | 6/2015 | Pierias .................... F24V 30/00 126/204 |
| 2017/0172234 A1 * | 6/2017 | Cox .................... A41D 19/001 |
| 2018/0289169 A1 * | 10/2018 | Le ......................... H05B 1/0297 |
| 2019/0059478 A1 * | 2/2019 | Walker ................ A41D 19/001 |

* cited by examiner

FORMABLE FLUID WARMING APPARATUS

FIELD OF THE DISCLOSURE

The present disclosure relates to a fluid warming apparatus, and more particularly to a fluid warming apparatus that can be formed around fluid vessels of varying sizes.

BACKGROUND

It is often desired to contain and transport fluid in a vessel for later use or consumption. Often, the fluid in the vessel is ideally used or consumed at an elevated temperature relative to the surrounding environment. A few non-exclusive examples of the fluid vessels and fluid considered herein are bottles holding milk, beverage containers holding beverages that are typically consumed warm, and personal lubricant containers holding lubricant that is ideally used in a warmed state. Regardless of the type of vessel and fluid considered, it is often difficult to warm the fluid in the vessel if the user does not have access to a conventional heating apparatus such as a microwave, stove, heater, fire, electrical warmer, or other heating device typically found in a household or business.

Not only is it difficult to warm the fluid in the vessel when access to a conventional heating apparatus is limited, many conventional heating apparatuses can warm the fluid in the vessel to undesirably hot temperatures. More specifically, the vessel may be a baby bottle and the fluid may be milk that is intended to be consumed by a baby. In this scenario, if the user has access to a conventional warming apparatus the user must be cautious not to overheat the milk which could harm the baby during consumption. In most situations, overheating the fluid in the vessel can result in injury to the person that utilizes the overheated fluid.

Alternatively, when the user does not have access to a conventional heating apparatus the fluid in the vessel may be undesirably cold. In one non-exclusive example, the user may be travelling or camping and not have access to a conventional heating apparatus. In these situations, the user has limited options for heating the fluid in the vessel. One option is to transfer the fluid to a travel stove or the like to be heated utilizing a portable heating apparatus and a portable heating container. However, even travel stoves or battery-based heating devices are often too large to travel with, potentially prohibited on aircraft, and are still susceptible to heating the fluid to undesirably hot temperatures. Further still, travel stoves often utilize an open flame or heating element that may be prone to igniting surrounding debris if the travel stove and surrounding environment are not properly supervised.

Other methods include implementing a warmer to create a pre-sized chamber in which the vessel and fluid may be placed to be warmed. These systems, however, are often sized to fit a single, particularly sized vessel and are not meant to accommodate many different vessel sizes and types.

Accordingly, there is a need for a fluid warming apparatus that is easily transportable and can be formed to accommodate vessels of varying sizes and shapes to warm fluid therein.

SUMMARY

One embodiment is a warming apparatus that has a formable apparatus and a chamber coupled to the formable apparatus and configured to fluidly contain a heating agent. Wherein, the formable apparatus is movable to reposition the chamber to heat a vessel while maximizing surface area contact.

One example of this embodiment has a membrane defining the chamber. In one aspect of this example, the formable apparatus is coupled to the membrane. In a different aspect of this example, the membrane contains the formable apparatus therein. In yet another example, the formable apparatus has a first finger extending from a hub. In one aspect of this example, the chamber has a hub chamber and a finger chamber fluidly coupled to one another. In another aspect of this example, the hub chamber is positioned by the hub of the formable apparatus and the finger chamber is positioned by the first finger. Yet another aspect of this example has a second finger extending from the hub. Another aspect of his example has a third finger extending from the hub. In a further aspect of this example, the chamber includes a first finger chamber at least partially defined along the first finger, a second finger chamber at least partially defined along the second finger, and a third finger chamber at least partially defined along the third finger. Another aspect has a hub chamber, wherein the first finger chamber, second finger chamber, and third finger chamber are fluidly coupled to the hub chamber.

In another example of this embodiment, the heating agent is sodium acetate trihydrate in solution. One aspect of his example includes an activating member that selectively initiates a warming reaction of the heating agent. In another aspect of this example, the activating member is a spring-steel kinetic activator positioned within the chamber.

Another embodiment is a method of manufacturing a vessel warming apparatus that includes providing a formable apparatus that is bendable to a plurality of configurations and a membrane, coupling the formable apparatus to the membrane, positioning a chamber along at least a portion of the membrane, filling the chamber with a heating agent, and fluidly sealing the chamber with the heating agent positioned therein.

In one example of this embodiment, the coupling the formable apparatus to the membrane step includes coupling the formable apparatus to an exterior surface of the membrane.

In another example of this embodiment, the coupling the formable apparatus to the membrane step includes forming the membrane around the formable apparatus.

In yet another example of this embodiment, the positioning the chamber along at least a portion of the membrane step involves forming the chamber with a chamber material and coupling the chamber to an external surface of the membrane.

Another example includes positioning the chamber along at least a portion of the membrane step involves forming the chamber within the membrane In yet another example, the coupling the formable apparatus to the membrane step includes forming the membrane around the formable apparatus and the positioning the chamber along at least a portion of the membrane step involves forming the chamber with a chamber material and coupling or adhering the chamber to an external surface of the membrane.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

Figure 1:
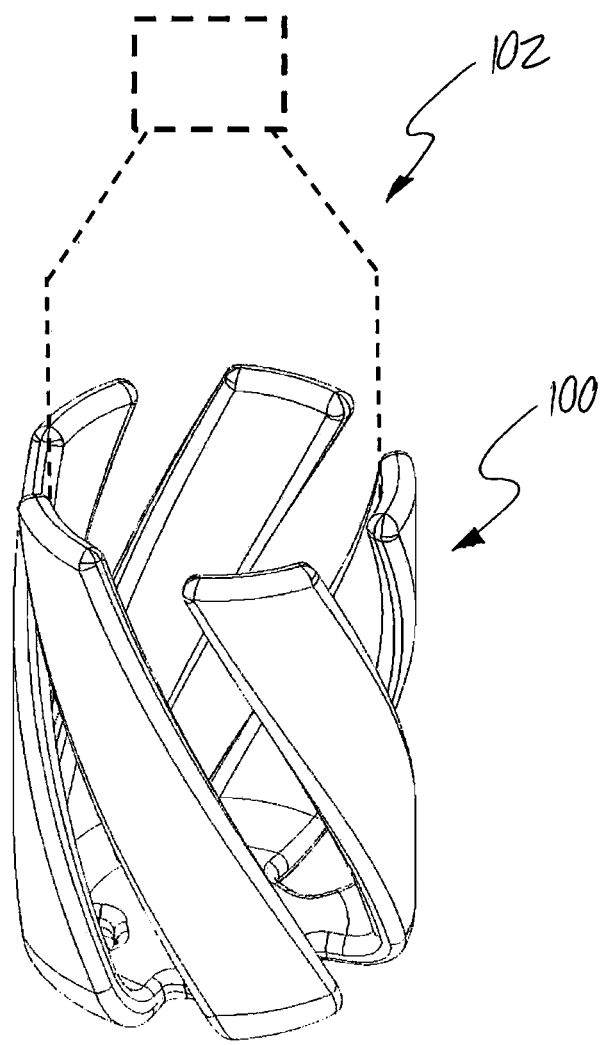
FIG. 1 is an elevated perspective view of a warming apparatus with a vessel therein.

For the purposes of promoting an understanding of the principles of the present disclosure, reference will now be made to the embodiments described herein and illustrated in the drawings and specific language will be used to describe the same. It will nevertheless be understood that no limitation of the scope of the present disclosure is thereby intended, such alterations and further modifications in the illustrated devices and methods, and such further applications of the principles of the present disclosure as illustrated therein being contemplated as would normally occur to one skilled in the art to which the present disclosure relates.

Referring to FIG. 1, a warming apparatus 100 is illustrated with a vessel 102 positioned therein. The vessel 102 may be any vessel configured to carry a fluid therein. In some non-exclusive examples, the vessel 102 may be a baby bottle, a soda bottle, a soda can, a flask, a personal lubricant dispenser, or any other vessel configured to hold and distribute a fluid to a user. As will be described in more detail herein, the warming apparatus 100 may be configured to both be formed to the outer surface of the vessel 102 and to heat the fluid contents of the vessel 102 when the warming apparatus 100 is activated.

Figure 2:
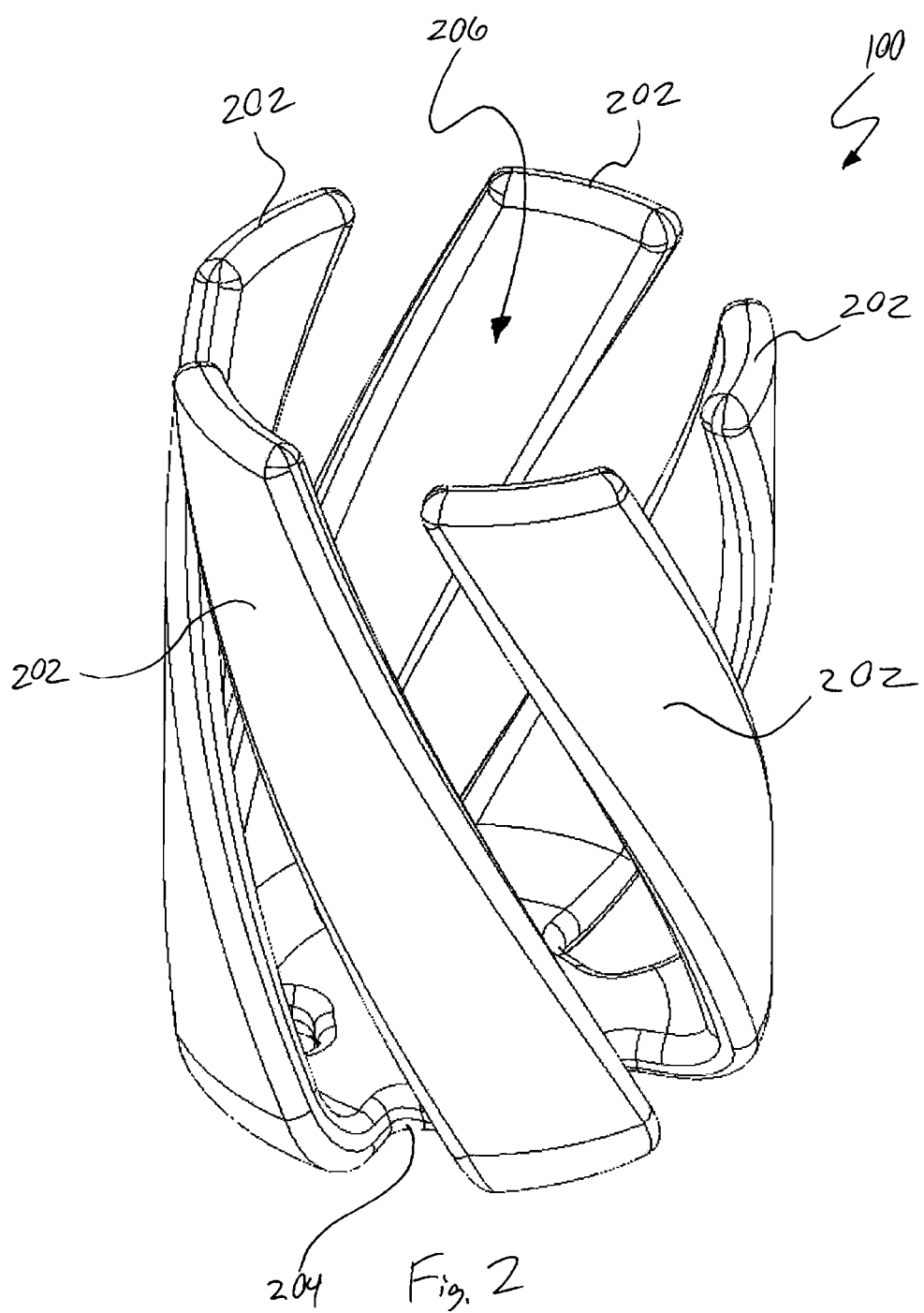
FIG. 2 is an elevated perspective view of the warming apparatus of FIG. 1.
Figure 3:
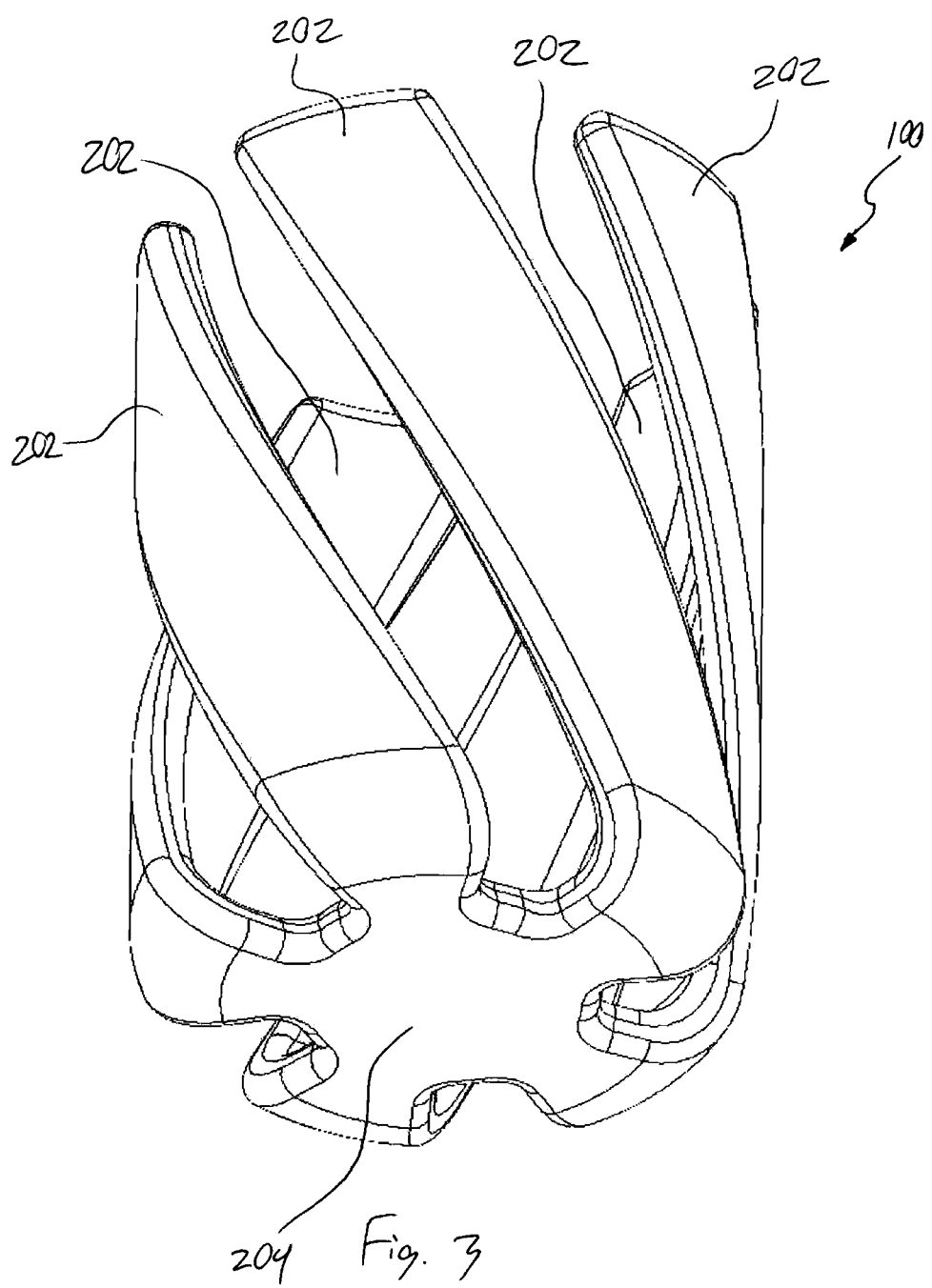
FIG. 3 is a lowered perspective view of the warming apparatus of FIG. 1.

Referring now to FIGS. 2 and 3, the warming apparatus 100 is illustrated separated from the vessel 102. The warming apparatus 100 may have at least one finger 202 extending from a hub 204. Each finger 202 may have both a forming component and a finger chamber defined at least partially there along. The forming component may extend from the hub 204 through at least a portion of the length of each finger 202. Further, the forming component may be a metal or the like material that allows each corresponding finger 202 to be independently manipulated or otherwise moved or bent relative to the hub 204 to conform the finger 202 to the contours of any vessel positioned in a central region 206. Accordingly, each finger 202 may be independently manipulated relative to the hub 204 to position the finger 202 along a portion of a vessel or the like positioned in the central region 206. Further, the forming component may be formed of a material that has a proper size and material characteristics to maintain the position of the finger 202 against the vessel once the finger 202 is position adjacent thereto.

Each finger 202 may also define the finger chamber at least partially there along. The finger chamber may be a fluid chamber that fluidly couples the finger chambers from each of the fingers 202 to one another. In one aspect of this disclosure, a hub chamber may be defined in the hub 204 to contain a fluid therein. The hub chamber may fluidly couple each of the finger chambers to one another so that all of the finger chambers and the hub chamber are fluidly coupled to one another.

The hub chamber and finger chambers may provide a location to contain a warming agent therein. The warming agent may be any fluid substance that is capable of generating heat when activated. In one non-exclusive example, the fluid substance is sodium acetate trihydrate ($NaC_2H_3O_2$ $3H_2O$), which can be selectively activated to generate heat when properly charged. In one aspect of this disclosure, fluidly coupling all of the finger chambers and the hub chamber to one another allows any chemical, structural or the like changes in the warming agent to be distributed to all fingers 202 of the warming apparatus 100. Accordingly, the forming component may allow each finger 202 to be moved to an outer surface of the vessel while the hub and finger chambers can distribute the warming agent to the portions of the warming apparatus 100 adjacent to the vessel to thereby warm any fluid within the vessel.

Figure 4:
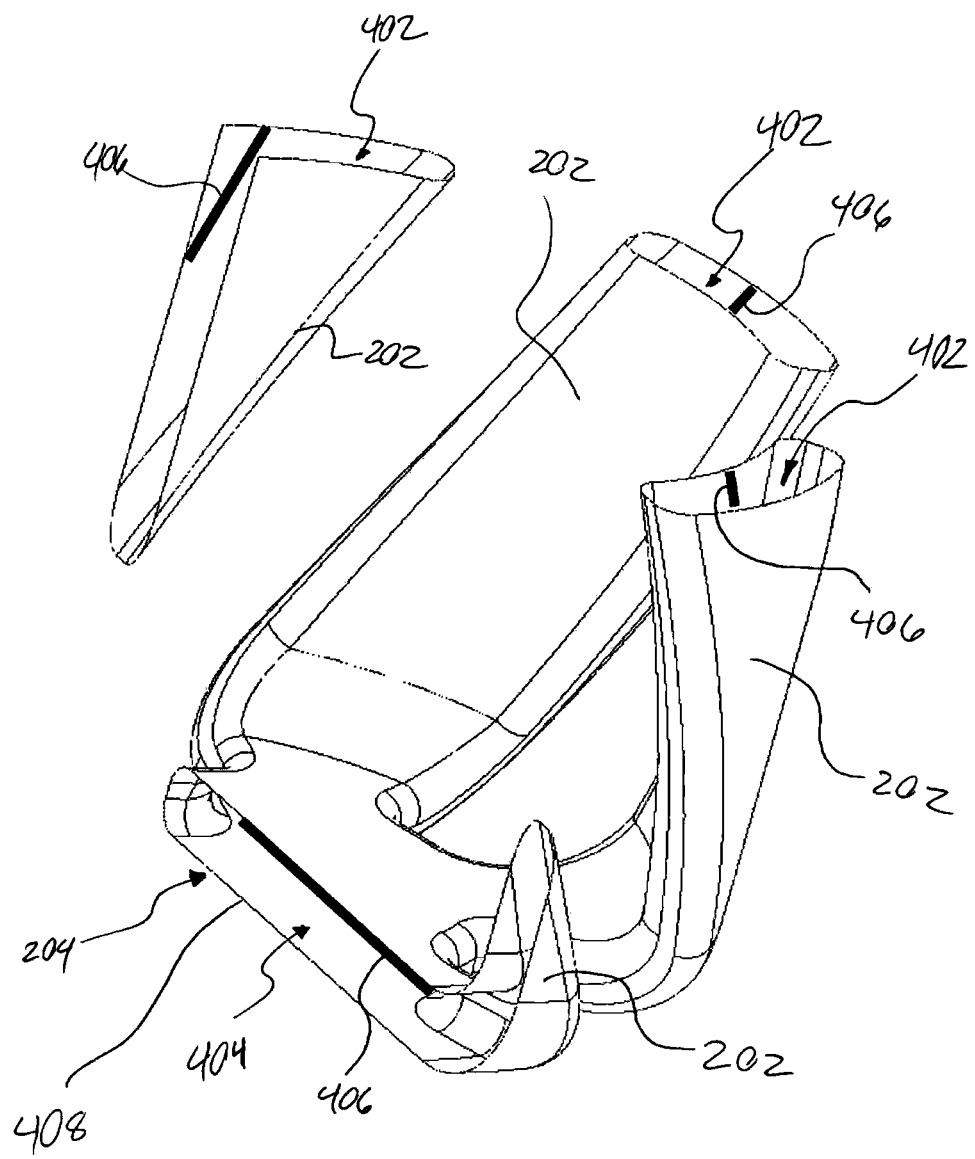
FIG. 4 is a partial view of the warming apparatus of FIG. 1.

In FIG. 4, one embodiment of finger chambers 402, a hub chamber 404, and a forming component 406 is illustrated. In the non-exclusive embodiment of FIG. 4, the warming apparatus may be a substantially hollow membrane 408 made of silicon, rubber, vinyl, or any other bendable material capable of fluidly defining a chamber. The hollow membrane 408 may defined therein each of the finger chambers 402 and the hub chamber 404 to be fluidly coupled to one another as described herein. Further, the warming agent may substantially fill the chambers 402, 404 and be distributed throughout the warming apparatus 100.

In the non-exclusive embodiment of FIG. 4, the forming component 406 may be positioned within the chambers 402, 404 of the warming apparatus 100. In this embodiment, the forming component 406 may be glued or otherwise adhered to an inner surface of the chambers 402, 404 to bend and move the fingers 202 when a sufficient force is applied thereto. The forming component 406 may be a single piece of material that is distributed at least partially into each of the fingers 202 and the hub 204 or it may be multiple pieces of material coupled to one another and positioned within the warming apparatus 100. The forming component 406 may be formed of any material that is bendable and that is sufficiently strong to maintain the orientation of the fingers 202 along the outer surface of a vessel when positioned thereby.

Figure 5:
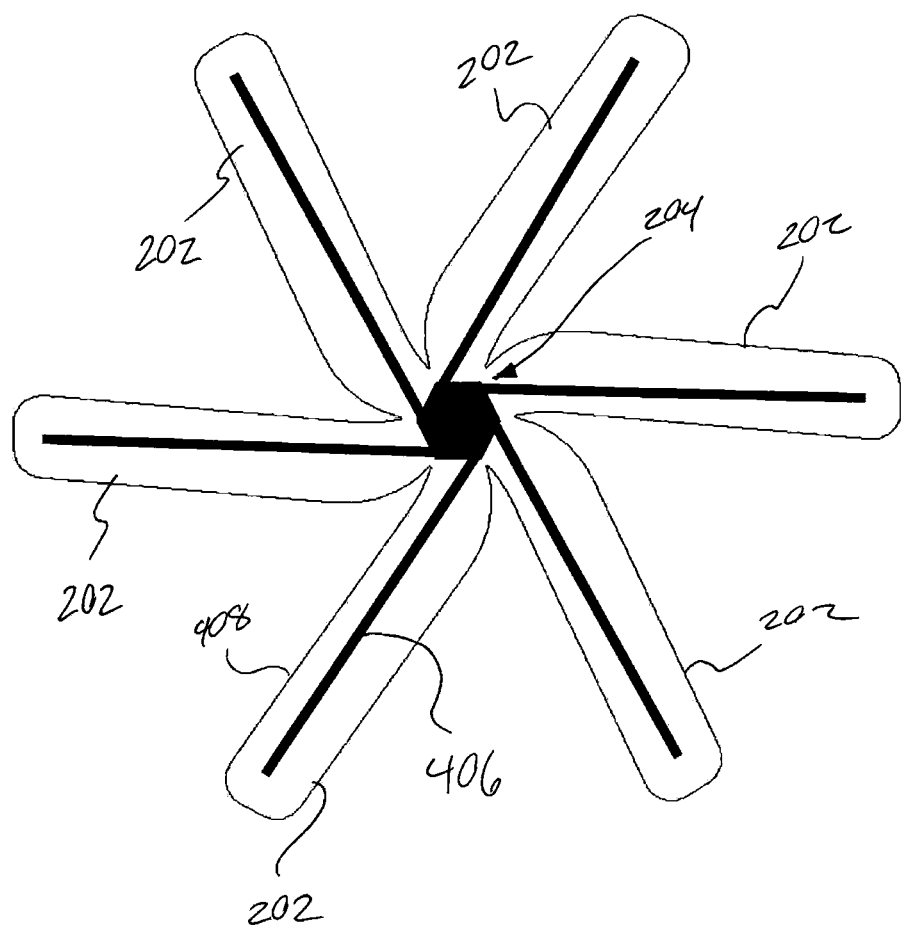
FIG. 5 is a bottom view of another embodiment of a warming apparatus of in a planar orientation.

In FIG. 5, the warming apparatus 100 is illustrated in a substantially planar orientation with the forming apparatus 406 shown. While in one embodiment the forming apparatus 406 is described as being positioned within the chambers 402, 404, other embodiments contemplate positioning the forming apparatus 406 along an exterior surface of the warming apparatus 100. In the non-exclusive example of FIG. 5, the forming apparatus 406 is illustrated coupled to the membrane 408 at an outer surface. The forming apparatus 406 may be coupled to the surface of the finger 202 that is intended to be opposite the vessel when positioned thereon to ensure that the forming apparatus 406 does not insulate heat transfer between the chambers 402, 404 and the vessel. The forming apparatus 406 may be one component or multiple components coupled to one another to allow for relative movement of the fingers 202 relative to the hub 204.

In other embodiments of this disclosure the forming apparatus 406 may also be positioned within the membrane 408 instead of being coupled to an inner or outer surface thereof. In other words, the membrane 408 may be formed with the forming apparatus 406 suspended therein. In this configuration, the forming apparatus 406 may still allow the fingers 202 and the like to be moved about the warming apparatus 100 but not require a separate coupling process for adhering the forming apparatus 406 to the membrane 408.

Figure 6:
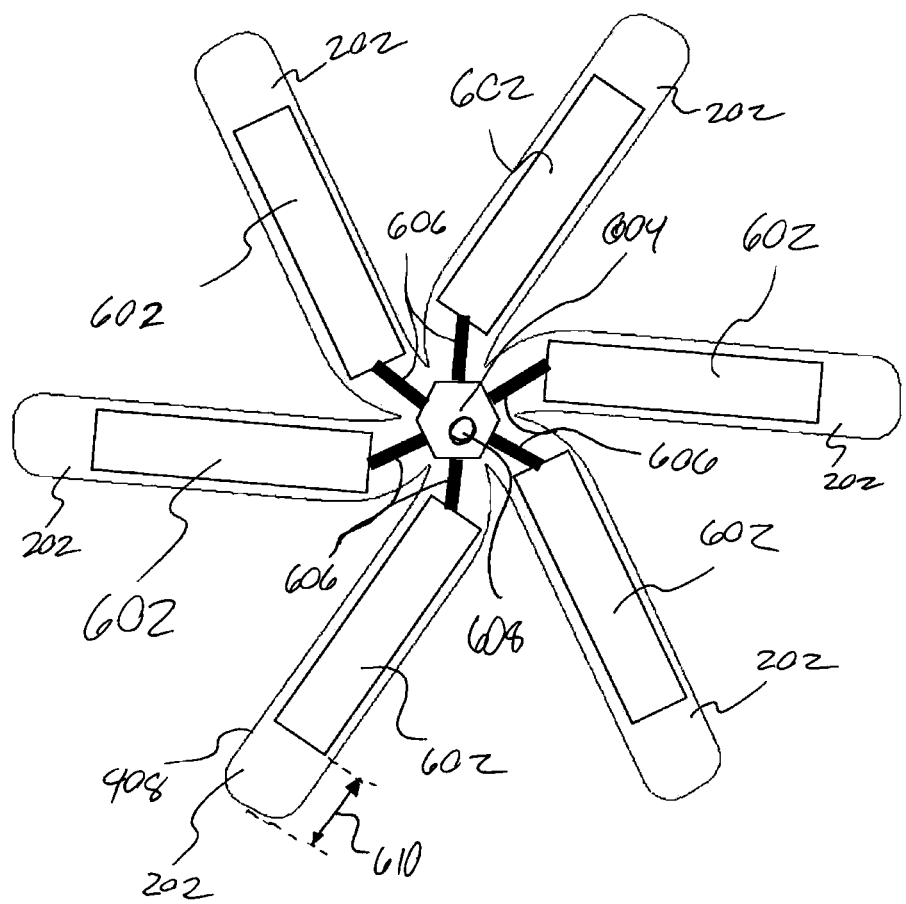
FIG. 6 is a top view of the warming apparatus of FIG. 5 in a planar orientation.

Referring now to FIG. 6, another embodiment of the present disclosure is illustrated. The embodiment of FIG. 6 illustrates finger chambers 602 and a hub chamber 604 that are coupled to an outer surface of the membrane 408. In the embodiment of FIG. 6, the chambers 602, 604 may be formed from a vinyl or the like material and be fluidly coupled to one another as described herein via fluid paths 606 or the like. In this configuration, there may not be chambers defined within the membrane 408 but rather the chambers 602, 604 are coupled to an exterior surface of the membrane 408. Further, the chambers 602, 604 may be formed from a separate vinyl membrane material or the like to thereby create a fluidly sealed environment for the warming agent.

The chambers 602, 604 may be fixedly or removably coupled to the corresponding fingers 202 and hub 204 of the warming apparatus 100. In one non-exclusive example, the finger chambers 602 are removably coupled to the corresponding fingers 202 with Velcro or the like. In another non-exclusive example the finger chambers 602 are glued to the corresponding fingers 202. Accordingly, any known permanent or removable coupling method known in the art may be used for coupling the chambers 602, 604 to the membrane 408.

Further still, the embodiment of FIG. 6 considers applying the forming apparatus 406 to any portion of the membrane 408 discussed herein. That is to say, the forming apparatus 406 may be coupled to an opposite side of the membrane 408 than the chambers 602, 604. Alternatively, the forming apparatus 406 may be positioned within the membrane 408 as described herein. In yet another aspect of this disclosure, the chambers 602, 604 may be coupled directly to the forming apparatus 406. Accordingly, this disclosure contemplates positioning the forming apparatus 406 and the membrane in any combination of configurations described herein with regards to the chambers 402, 404, 602, 604.

In yet another aspect of this disclosure, a fingertip length 610 may be varied to allow the warming apparatus 100 to be applied to many different vessels. More specifically, the fingertip length 610 may be the length the finger 202 extends past the corresponding chamber 402, 602. A long fingertip 610 may be utilized to allow the membrane 408 and the forming apparatus 408 to grip the vessel and prevent the warming apparatus from separating therefrom. Accordingly, any fingertip length 610 may be utilized to create a warming apparatus 100 that can be coupled to any shaped vessel.

In one aspect of this disclosure, any of the chambers discussed herein may have an activating member 608 positioned therein. The activating member 608 may be any member that is capable of activating the warming agent to begin the warming process. In the case of sodium acetate trihydrate, the activating member 608 may be a spring-steel kinetic activator that can bend to initiate a crystallization or other heat-generating reaction of the warming agent. In this configuration, when the warming agent is properly charged the activating member 608 may be engaged by the user to start a warming process.

While a metal disc is described herein as the activating member 608, other embodiments may utilize an activating member 608 that releases a chemical into the warming agent to initiate a warming response. In this configuration, a user may break or otherwise release the chemical from the activating member 608 to combine with the warming agent to heat the warming apparatus 100. Accordingly, any type of activating member 608 that can cause a heated reaction to a warming agent is considered herein.

In one embodiment of this disclosure, the warming apparatus 100 may be repeatedly repositioned and reused. More specifically, the forming apparatus 406 may be bent to conform to a vessel having any outer shape to thereby apply any heat generated by the warming apparatus to the vessel by positioning the chambers adjacent to one or more outer vessel walls. Further, when the warming agent is sodium acetate trihydrate, the warming agent can be charged by boiling the warming apparatus 100 or chambers 402, 404, 602, 604 in water for a sufficient time to substantially break down crystalline structures formed therein. Once the warming agent is charged, the activating member 608 may be engaged or otherwise clicked by the user to initiate a warming process of the warming agent. Once the warming process is initiated, the warming apparatus may be formed around any vessel by bending the forming apparatus 406 to position the warming apparatus 100 at least partially around the vessel.

In yet another aspect of this disclosure, the warming apparatus 100 may not contain more than about 3.4 ounces of warming agent or any other fluid. More specifically, the volume in the chambers 402, 404 may be such that any warming agent positioned therein will have a volume at, or less than, 3.4 ounces. By defining a volume of at, or less than, about 3.4 ounces, the warming apparatus 100 may be transferred on planes and the like because it does not contain a volume greater than allowed. While 3.4 ounces is described herein, that particular volume is intended as only one non-exclusive example used for travel. Other embodiments have chambers that define a volume of greater than 3.4 ounces, and this disclosure considers any volumetric size of the chambers.

Figure 7:
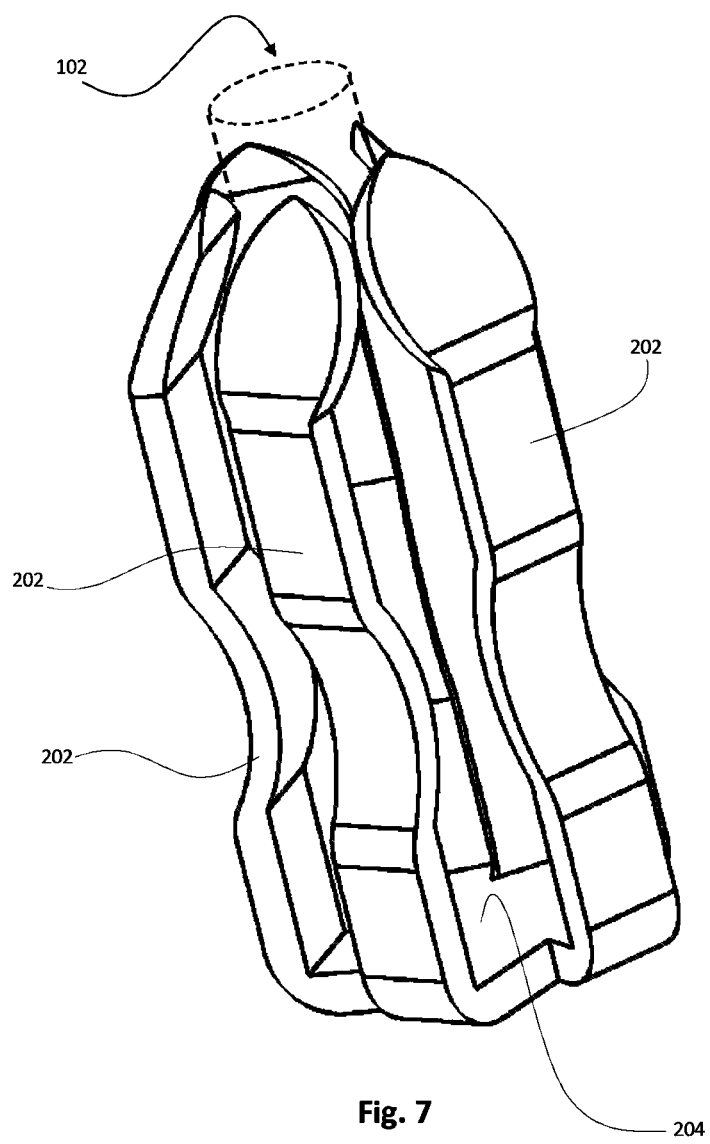
FIG. 7 is an elevated perspective view of another embodiment of the warming apparatus coupled to a vessel.

Referring now to FIG. 7, yet another embodiment of the warming vessel is illustrated. More specifically, in FIG. 7 the fingers 202 are illustrated following the contours of the vessel 102. Further, in one aspect of the embodiment of FIG. 7, the fingers 202 may have a distal end or tip that can be manipulated to taper inwardly with a neck of the vessel 102. In this configuration, the warming apparatus may substantially restrict the vessel 102 from falling out of the warming apparatus because the tips of the fingers 202 taper inwardly to grasp the vessel 102.

FIG. 7 is just one non-exclusive example of how the fingers 202 can be manipulated to follow the outer contours of the vessel 102. Accordingly, the warming apparatus may also be utilized to closely conform to outer contours of a baby bottle, flask, personal lubricant, or any other vessel that contains a fluid that may be warmed. Further, the fingers 202 may be tapered inwardly along the neck of the vessel to substantially restrict the vessel from unintentionally slipping there out. The warming apparatus can take any form to comply with the outer surface of a plurality of different vessels. Accordingly, the embodiments illustrated herein are meant only as examples, and other configurations and sizes are also considered within the scope of this disclosure.

While exemplary embodiments incorporating the principles of the present disclosure have been described herein, the present disclosure is not limited to such embodiments. Instead, this application is intended to cover any variations, uses, or adaptations of the disclosure using its general principles. Further, this application is intended to cover such departures from the present disclosure as come within known or customary practice in the art to which this disclosure pertains.

The invention claimed is:

1. A warming apparatus, comprising:
   a formable apparatus having a first finger extending from a hub; and
   a chamber coupled to the formable apparatus and configured to fluidly contain a heating agent;
   wherein, the formable apparatus is movable to reposition the finger relative to the hub to position the chamber adjacent to a vessel to heat the vessel;
   wherein, the formable apparatus is formed of a material that is bendable and that is sufficiently strong to maintain a bent orientation of the chamber along an outer surface of the vessel when positioned thereby.

2. The warming apparatus of claim 1, further comprising a membrane defining the chamber.

3. The warming apparatus of claim 2, further wherein the formable apparatus is coupled to the membrane.

4. The warming apparatus of claim 2, further wherein the membrane contains the formable apparatus therein.

5. The warming apparatus of claim 1, further wherein the chamber has a hub chamber and a finger chamber fluidly coupled to one another.

6. The warming apparatus of claim 5, further wherein the hub chamber is positioned by the hub of the formable apparatus and the finger chamber is positioned by the first finger.

7. The warming apparatus of claim 1, further comprising a second finger extending from the hub.

8. The warming apparatus of claim 7, further comprising a third finger extending from the hub.

9. The warming apparatus of claim 8, further wherein the chamber includes a first finger chamber at least partially defined along the first finger, a second finger chamber at least partially defined along the second finger, and a third finger chamber at least partially defined along the third finger.

10. The warming apparatus of claim 9, further comprising a hub chamber, wherein the first finger chamber, second finger chamber, and third finger chamber are fluidly coupled to the hub chamber.

11. The warming apparatus of claim 1, further wherein the heating agent is sodium acetate trihydrate.

12. The warming apparatus of claim 11, further comprising an activating member that selectively initiates a warming reaction of the heating agent.

13. The warming apparatus of claim 12, further wherein the activating member is a spring-steel kinetic activator positioned within the chamber.

* * * * *